United States Patent
Yue (10) Patent No.: US 6,453,094 B1
(45) Date of Patent: Sep. 17, 2002

(54) ALL FIBER DWDM MULTIPLEXER AND DEMULTIPLEXER

(75) Inventor: Chaoyu Yue, Dobbs Ferry, NY (US)

(73) Assignee: Keystone Fiberoptics Inc., Dobbs Ferry, NY (US)

( * ) Notice: Subject to any disclaimer, the term of this patent is extended or adjusted under 35 U.S.C. 154(b) by 0 days.

(21) Appl. No.: 09/773,995

(22) Filed: Feb. 1, 2001

(51) Int. Cl.[7] .............................. G02B 6/34; G02B 6/26; H04J 14/02

(52) U.S. Cl. ............................ 385/37; 385/42; 385/43; 385/126; 359/124; 359/127; 359/130

(58) Field of Search ........................... 385/15, 16, 18, 385/20, 21, 24, 27–29, 31, 37, 39, 42, 50, 51, 96, 126, 47; 359/115, 121, 124, 127, 128, 130

(56) References Cited

U.S. PATENT DOCUMENTS

| | | | | |
|---|---|---|---|---|
| 5,016,967 A | * | 5/1991 | Meltz et al. ................... | 385/37 |
| 5,058,977 A | | 10/1991 | Sorin ........................... | 385/30 |
| 5,170,450 A | | 12/1992 | Dahlgren ...................... | 385/43 |
| 5,940,556 A | * | 8/1999 | Moslehi et al. ................ | 385/28 |
| 6,278,818 B1 | * | 8/2001 | Laming et al. ................ | 385/37 |
| 6,360,038 B1 | * | 3/2002 | Grubsky ....................... | 385/28 |

OTHER PUBLICATIONS

L. Dong et al., "Novel High Performance All–Fiber Optical Add/Drop Multiplexer Based On A Selective Fused Coupler And A Single Fibre Bragg Grating", Post Deadline Paper—Optical Fiber Communications Conference, PD9 pp. 1–4 (Mar. 1999).

* cited by examiner

Primary Examiner—Brian Healy
Assistant Examiner—Kevin S. Wood
(74) Attorney, Agent, or Firm—Brian K. Dinicola (57) ABSTRACT

A dense wavelength division multiplexing (DWDM) filter includes an optical fiber coupling device, having at least one multiple core optical fiber fusion coupled to a second optical fiber, and a dual core fiber grating. According to an especially preferred embodiment of the invention, two multiple core fibers are used with each multiple core fiber having a first core with a first effective index of refraction and a first propagation constant and a second core with a second effective index of refraction and a second propagation constant. Such an arrangement ensures a close match in effective index and propagation constant between the respective second cores. The first and second multiple core fibers are aligned and fused together such that the second core of the first multiple core fiber is in sufficient proximity to the second core of the second multiple core fiber as to obtain overlapping mode fields and efficient coupling of propagating optical signals therebetween, while the first core of the first multiple core fiber is sufficiently separated from the first core of the second multiple core fiber as to obtain weak or substantially no coupling of propagating optical signals therebetween. Accordingly, any signals propagating along the first core of the first fiber experience only very low loss, on the order of 0.2 dB. The dual core fiber grating provides wavelength selectivity to accommodate either wavelength addition or wavelength subtraction, depending upon whether a multiplexing or demultiplexing functionality is desired.

20 Claims, 5 Drawing Sheets

ALL FIBER DWDM MULTIPLEXER AND DEMULTIPLEXER

BACKGROUND OF THE INVENTION

1. Field of the Invention

The present invention relates generally to the field of fiber optic components and, more particularly, to optical multiplexers and demultiplexers.

2. Discussion of the Prior Art

The dense wavelength division multiplexed (DWDM) optical fiber communication systems of today rely heavily upon the simultaneous launching of many optical signals, each at a respectively different wavelength, into a given fiber in order to efficiently utilize as much of the available bandwidth of that fiber as possible. The optical multiplexer/demultiplexer (Mux/Demux), also commonly referred to as a WDM or DWDM filter, is a key component of such optical systems. As will be readily appreciated by those skilled in the art, a multiplexer is used to combine optical signals of different wavelengths into a single fiber so that they may be transmitted efficiently to a remote location. Conversely, a demultiplexer separates the respective wavelength signals propagating along a single fiber so that, for example, each of the optical signals may be individually processed. Optical transmission system architects have always been concerned with maintaining an adequate system power margin in order to ensure an acceptable signal to noise ratio and low bit error rate at the desired rate of transmission. As the number of wavelengths to be added to and/or dropped from each optical fiber link has continued to increase, the need for a scalable Mux/Demux solution having low associated insertion losses has become more important than ever.

The three general types of DWDM filters principally used today are thin-film filters, arrayed waveguide gratings (AWG) and fiber Bragg gratings used in conjunction with an optical circulator. In each of these three general types of DWDM filters, optical energy or light is removed from the fiber and is either collimated into a free space light beam or redirected into a specially configured waveguide. The principal disadvantage of these DWDM filter structures is the high losses associated with moving optical energy out of the fiber and refocusing the light back into the fiber. A further disadvantage of such filters is the need for adherence to strict mechanical tolerances and the attendant vulnerability to vibration and environmental changes. In view of these disadvantages, substantial investigative effort has been directed toward the development of a filter configuration that keeps the optical energy inside the fiber. Such a configuration is generally referred to as an "in-line" filter.

One in-line filter approach, applicable to single-mode fiber, is described by F. Bilodeau et al. in *IEEE Photonics Technology Letters*, Vol. 7. pp. 388–390 (1995). The device described by Bilodeau et al. is essentially an optical channel add/drop filter based on two Bragg gratings defined in the arms of two concatenated 3 dB fused fiber couplers. The position of the two identical gratings must be accurately controlled to provide in-phase reflection in the two arms of each coupler. This interferometric arrangement requires path length trimming during device fabrication, and the precise optical phase must be maintained during the device lifetime.

Another "in line" add/drop filter implementation is proposed by F. Bakhti et al. in *Electron. Letters*, Vol. 33, pp. 803–804 (1997). The structure proposed by Bakhti et al. requires that a fiber grating be written onto the "waist" or narrowly tapered portion of a fused coupler. The position of the grating related to the coupler is critical in the structure proposed by Bakhti et al. Unfortunately, the difficulty associated with realizing the precise alignment of the grating has rendered manufacture of the Bakhti et al. structure commercially impractical.

A more recent approach to the heretofore unsatisfied need for an "in line" filter is described by B. Ortega et al. in IEEE Journal of Lightwave Technology, Vol. 17, 1, pp. 123–128 (1999). The filter proposed by Ortega comprises a twin core fiber and single core fiber, a mixed fused tap coupler, and a fiber Bragg grating. Inside the tap coupler coupling range, there are three modes exhibited by the single core fiber, the twin core fiber's high effective refractive index and numeric aperture (NA) core and the twin core fiber's lower effective refractive index and NA core, respectively. According to theoretical analysis and experimental evaluation by the inventors herein, for the kind of tap coupler employed by Ortega, the high NA core mode and single core mode can be easily and efficiently coupled to each other, but the low NA core mode will be affected by the cladding mode, causing at least a three (3) db (50%) loss of optical power.

Accordingly, a continuing need exists for an in-line DWDM filter which is characterized by a repeatable, low level of insertion loss. A further need exists for a DWDM filter structure which is commercially practicable to manufacture.

SUMMARY OF THE INVENTION

The aforementioned needs are addressed, and an advance is made in the art, by an all-fiber, in line filter structure comprising a dual core fiber fused coupler and a dual core fiber grating. Essentially, the dual core fiber fused coupler of the present invention comprises at least one multiple core optical fiber and one other optical fiber. According to an especially preferred embodiment of the present invention, two dual core optical fibers are employed since these may be easily manufactured during the same production run, and under the same processing conditions, so that variations which would otherwise result in a mismatch of optical characteristics between the respective fibers sections of the coupler are substantially avoided. In this way, reliable and repeatable insertion loss performance may be readily achieved. However, provided certain fiber selection and fabrication steps are observed, it is also possible to employ a coupler having a dual core fiber fused to a single core fiber in the construction of DWDM filters according to the present invention.

Where two multiple core fiber structures are employed in the coupler, each multiple core fiber has a first core with a first effective index of refraction and a first propagation constant and a second core with a second effective index of refraction and a second propagation constant. The first and second multiple core fibers are aligned and fused together such that the second core of the first multiple core fiber is in sufficient proximity to the second core of the second multiple core fiber as to obtain overlapping mode fields and efficient coupling of propagating optical signals therebetween, while the first core of the first multiple core fiber is sufficiently separated from the first core of the second multiple core fiber as to obtain weak or substantially no coupling of propagating optical signals therebetween.

In accordance with an illustrative embodiment of the present invention, the respective first core of each corresponding multiple core fiber extends along a longitudinal, geometric central axis of the corresponding multiple core fiber, while the respective second core of each corresponding multiple core fiber extends along a longitudinal fiber axis offset from a geometric central axis of said corresponding multiple core fiber. The effective index of refraction of each respective first core is lower than an effective index of refraction of a corresponding second core.

An illustrative filter device constructed in accordance with the present invention is obtained by defining, in the second core of one of the multiple core fibers, a fiber Bragg grating. Illustratively, this may be achieved by making the second core, but not the first core, sensitive to incident ultraviolet radiation, such that the grating may be formed by photolithographic pattern definition and UV exposure. To accommodate an all optical add or drop functionality, as in DWDM multiplexers and demultiplexers, respectively, the period of the fiber Bragg grating is selected to efficiently couple an optical signal at a corresponding selected wavelength, propagating in a first direction along a first core of the first multiple core fiber, to the second core of the first multiple core fiber as an optical signal at the selected wavelength propagating in a second direction opposite to the first direction.

BRIEF DESCRIPTION OF THE DRAWINGS

Other features and advantages of the invention will be better understood by reference to the detailed description which follows, taken in conjunction with the annexed drawings, in which.

DETAILED DESCRIPTION OF THE INVENTION

Throughout the various views hereinafter described, like elements are referenced by like numerals. Thus, with initial reference to FIG. 1A, there is shown an in-line DWDM optical filter 10 constructed in accordance with an illustrative embodiment of the present invention and including a fused dual core fiber coupler 12, fabricated from two fused segments 14 and 16 of multiple core optical fiber, and a dual core fiber grating 18. The use of two dual core fiber segments is preferred because the respective multiple core optical fibers segments may be manufactured during the same production run, and under the same processing conditions. As such, the effective refractive index and propagation constant may be presumed to be identical from a fiber core of one multiple core fiber to its counterpart in another multiple core fiber. However, as will be described in more detail shortly, optical coupling between the first fiber segment and second fiber segment is only beneficial, for the purposes of the present invention, between the second core of each dual core fiber segment. As such, while the effective refractive index and propagation constant of the second core of each fiber segment should be as closely matched as possible and, preferably, identical to one another, it is not necessary for those parameters to be the same or closely matched for the first optical core of each segment.

It should also be noted here that a dual core fused fiber coupler, for use in a DWDM filter according to the invention, may alternatively be formed from one dual core fiber segment and one single core fiber segment. In such case, the effective refractive index of the single core should match the effective refractive index of the second core of the dual core fiber.

Figure 1A:
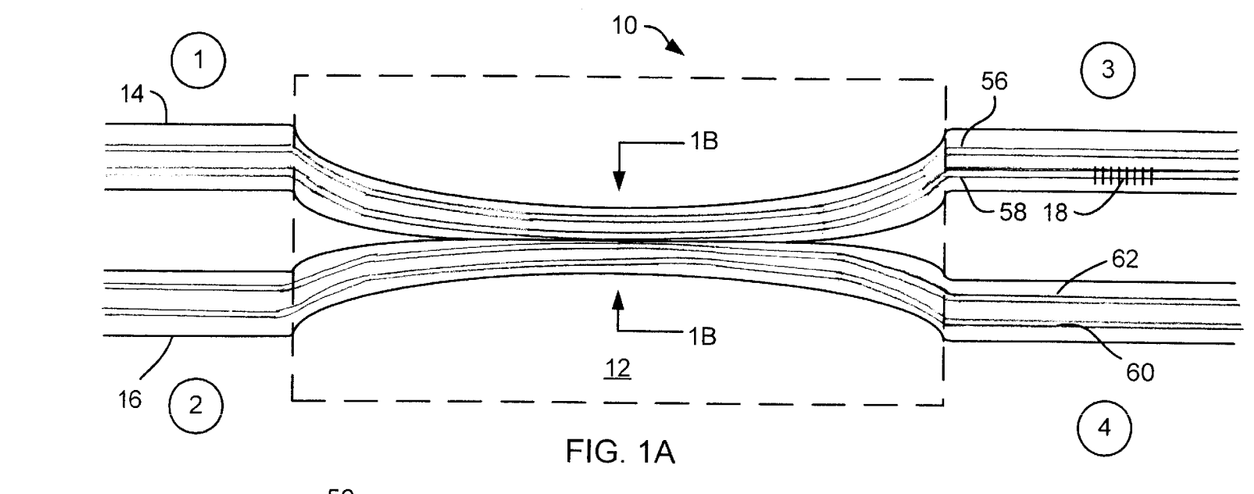
FIG. 1A is a schematic view of an all fiber, in-line DWDM filter incorporating a dual core fiber fused coupler and dual core fiber grating in accordance with the present invention.

In any event, and with continued reference to FIG. 1A, it will be seen that first dual core fiber segment 14 includes a first core 56 and a second core 58 extending parallel thereto. Similarly, the second dual core fiber segment 16 includes a first core 60 and a second core 62 extending parallel thereto. In each multiple core fiber segment, the numerical aperture ($NA_1$) or effective refractive index of the first core is lower than the numerical aperture ($NA_2$) or effective refractive index of the second core. While the first and second cores are close enough such that the respective optical mode fields propagating in each core partially overlap, they are preferably dimensioned and arranged so that their propagation constants are sufficiently different as to minimize or prevent coupling of optical energy between them. That is, within a multiple core fiber segment as segment 14 or 16, an optical signal propagating in one core will remain in that same core, with no or negligible coupling into an adjacent core.

In accordance with an especially preferred embodiment of the present invention, the lower effective index or first core, as first core 56 of fiber segment 14, is located at the geometric center of the fiber segment. Such an arrangement facilitates a low loss splice connection between the dual core segment and a standard single core fiber (not shown), which may be located upstream, downstream, or both of dual core fiber coupler 12 to thereby form, for example, part of an optical link between a transmitter and receiver (not shown).

Figure 1B:
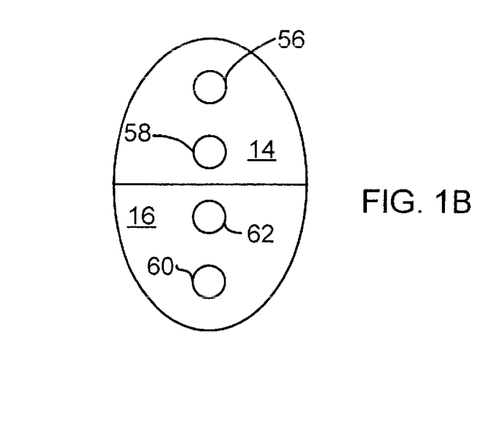
FIG. 1B is a cross sectional view of the dual core fiber fused coupler employed in the in line DWDM embodiment of FIG. 1A.

With continued reference to FIG. 1A, it will be seen that the first and second multiple core fiber segments 14 and 16 are aligned and fused together such that the second core 58 of the first multiple core fiber segment 14 is in sufficient proximity to the second core 62 of the second multiple core fiber segment 16 as to obtain overlapping of mode fields and efficient coupling of propagating optical signals therebetween and such that the first core 56 of the first multiple core fiber is sufficiently separated from the first core 60 of the second multiple core fiber as to obtain weak or substantially no coupling of propagating optical signals therebetween. The alignment of cores within an illustrative fused coupler constructed in accordance with the present invention is shown in FIG. 1B. As seen in FIG. 1B, second core 58 and second core 62 are in close proximity to one another, while first core 56 and first core 60 are much further separated from one another. While it is possible to angularly reorient the respective multiple core fiber segments such that all cores do not lie substantially in the same plane, the orientation shown in FIG. 1B provides the greatest separation between the respective first cores and is therefore especially preferred.

Figure 2:
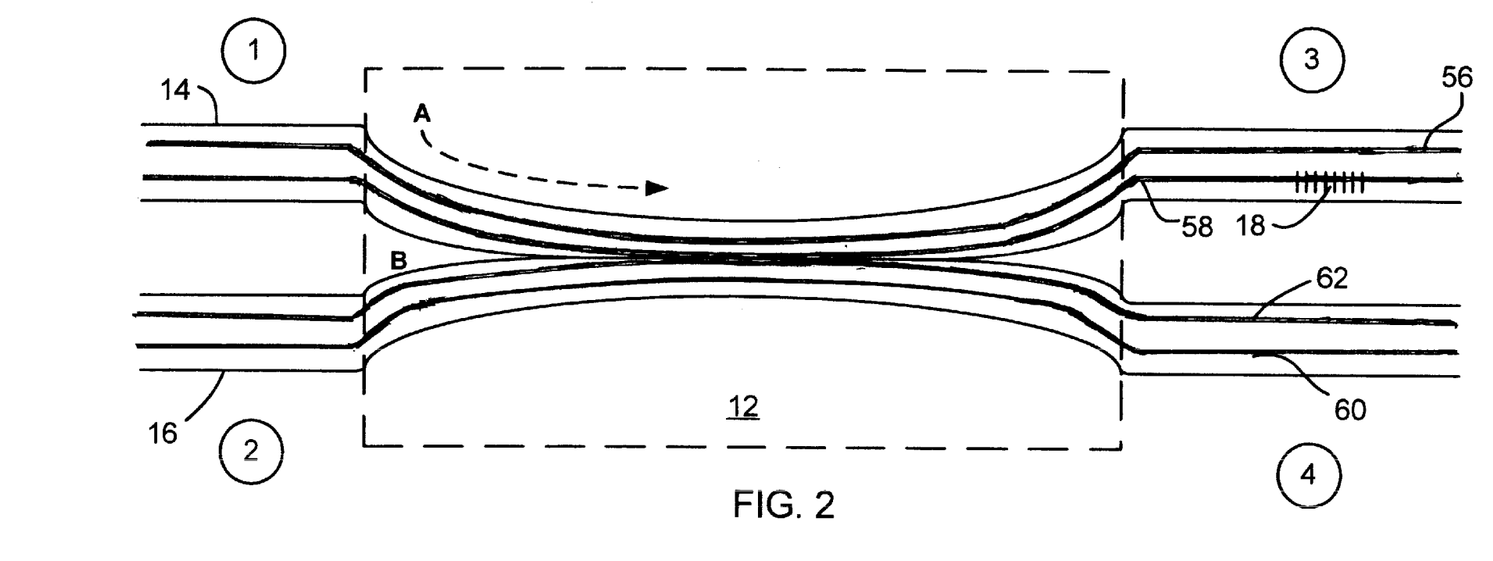
FIG. 2 is a schematic view generally illustrating the coupling of optical signals within the dual core fiber fused coupler of the DWDM filter embodiment of FIG. 1A, with arrows included to indicate the opposite relationship between the direction of optical signal propagation through the first core of a first dual core fiber and the direction of coupling from the second core of the first dual core fibe[00f8] into the second core of a second dual core fiber.

FIG. 2 is a schematic view generally illustrating the coupling of optical signals within the dual core fiber fused coupler of the DWDM filter embodiment of FIG. 1A, with arrows included to indicate the opposite relationship between the direction of optical signal propagation through the first core 56 of first dual core fiber 14 (arrow A) and the direction of coupling from second core 58 of first fiber segment 14 into the second core 62 of the second fiber segment 16 (arrow B).

In fabricating the fused dual core fiber coupler portion of the in line DWDM filter of the present invention, each fiber segment is stripped of most, but not all of its cladding, along a coupling region parallel to its higher effective index, second core. This may be achieved, for example, by embedding the fiber segment in a groove cut in a glass block, grinding the cladding down to the vicinity of its core, and highly polishing the interface. An exemplary technique is generally described in a disclosure by R. A. Bergh, G. Kotler, and H. J Shaw, entitled "Single-Mode Fiber Optic Directional Coupler", Electronics Letters, Vol. 16, No. 7, Mar. 27, 1980, pp. 260–261. Enough cladding is removed from each fiber segment to achieve the desired overlap of mode fields between the respective second cores while avoiding undesirable coupling of energy between the first cores. An exemplary range of edge-to-edge spacing between the second core of the two multiple core fiber segments 14 and 16 constituting dual core fiber fused coupler 12 is from about 0.2 to about 1.0 $\mu$n, depending upon the coupling length—which may range, for example, from about 2 mm to about 6 mm. By way of illustrative example, a spacing of 0.4 $\mu$n and coupling length of about 5 mm has been found to produce acceptable results.

The ground surfaces of the respective fiber segments are then fused together by heating and pulling according to any conventional technique, resulting in the structure shown in FIGS. 1A-4. Care should be taken in the amount of pulling force applied, particularly as this will have a tendency to alter the coupling between the respective second cores. As noted above, a dual core fused fiber coupler for use in a DWDM filter according to the invention, may alternatively be formed from one dual core fiber segment and one single core fiber segment provided the effective index of the single core closely matches the effective index of the second core of the dual core fiber. Employing the same general technique and process steps noted above in the two dual core configuration, the part of the cladding of the dual core segment and of the single core fiber segment corresponding to the fusion interface are removed. The segments are then aligned and fused together. As will be readily appreciated by those skilled in the art, the second core of the dual core segment and the single core must be close enough to obtain overlapping mode fields and efficient coupling of propagating optical signals in the second core and the single core. The light propagating in the first core preferably has no phase match with the single core fiber so that there is no coupling or only negligible coupling between the first core and the single core fiber. In any event, it suffices to say that by observing the process steps described herein, it is now possible to obtain dual core fiber fused couplers which will advantageously provide the low loss coupling sought for the add/drop filters, multiplexers, and demultiplexers of today's DWDM applications.

Working realizations of the coupler configuration employed in the DWDM filter embodiments of FIGS. 1A-4 have been repeatedly demonstrated to have a low insertion loss (on the order of 0.2 dB). Given such performance, it is contemplated by the inventor herein that a diverse range of applications exist for the fused dual core fiber coupler employed in the DWDM filter of the present invention. However, for clarity and brevity of explanation, the non-limiting examples of low loss add/drop filters for demultiplexing and multiplexing operations are deemed to be sufficiently illustrative and will now be described in detail with reference to FIGS. 3 and 4, respectively.

Figure 3:
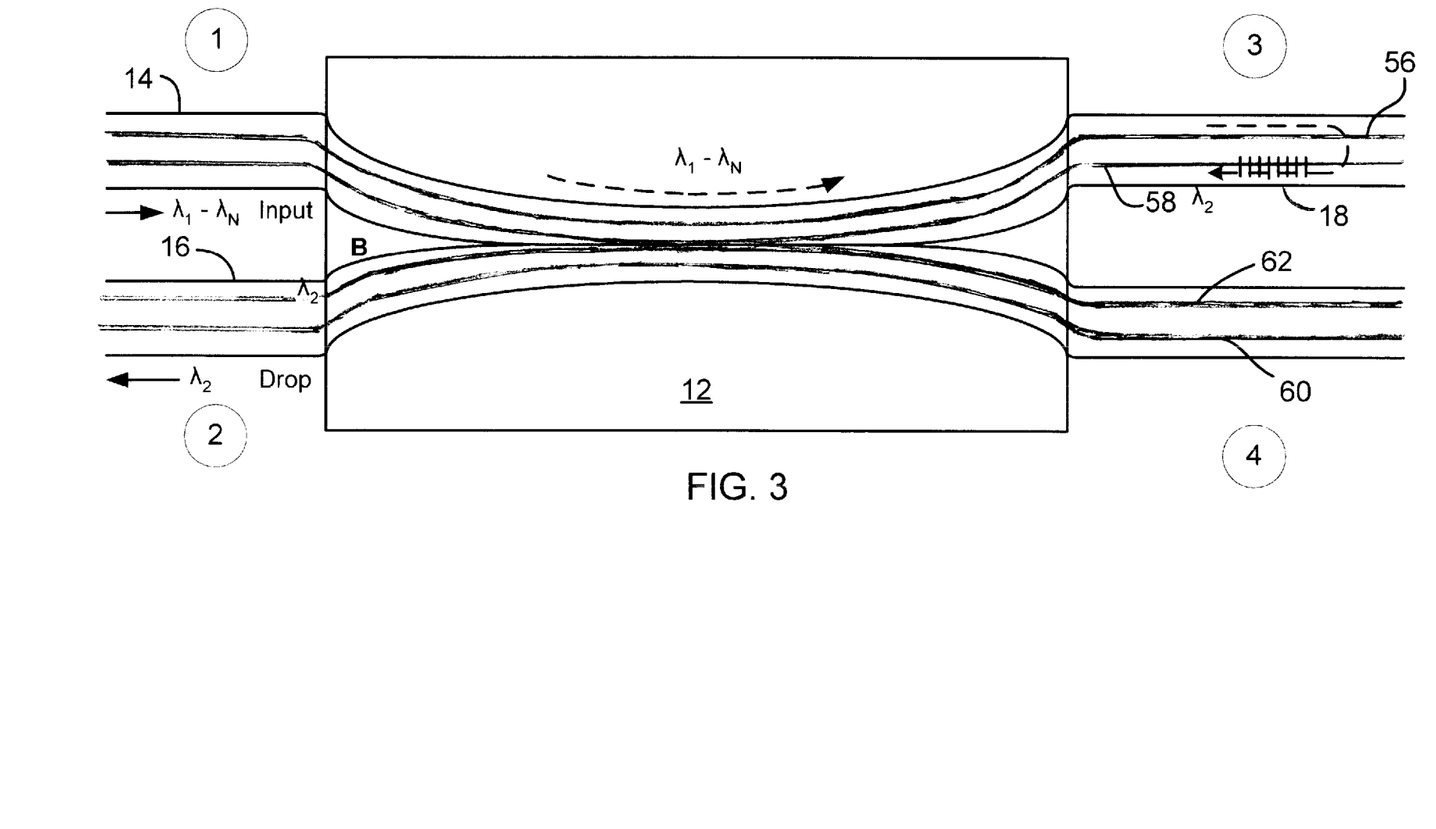
FIG. 3 is a demultiplexer constructed in accordance with an embodiment of the DWDM filter of the present invention, with arrows added to indicate the direction in which DWDM optical signals propagate through the first core of a dual core fiber and the opposite direction of coupling, via al core fiber grating, of a selected optical signal into the core of a second fiber.
Figure 5:
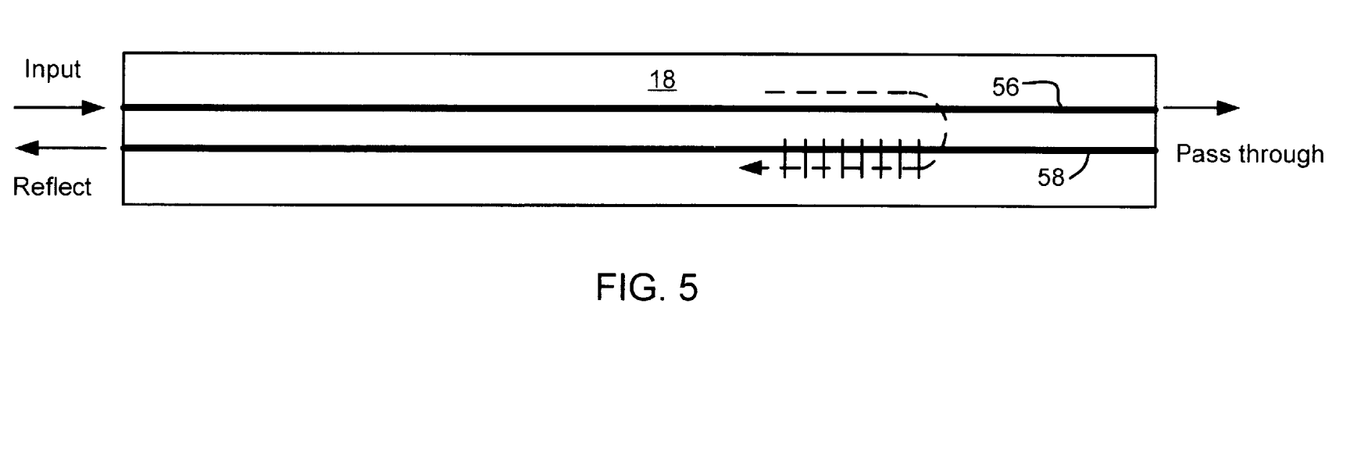
FIG. 5 schematic view of an illustrative dual core fiber grating for use in an inline DWDM filte[00f8] constructed in accordance with the present invention.

A demultiplexer 22 constructed in accordance with the present invention is shown in FIG. 3. To implement the demultiplexing structure 22 of FIG. 3, light is input via fiber port 1 of fused coupler 12 into first core 56 of dual core fiber segment 14 so as to propagate through the fused coupler to fiber port 3. As seen in FIGS. 3 and 5, a fiber grating 18 is written to the second core 58. This may be achieved via any suitable technique. By way of illustrative example, the higher effective index second core may be doped with germanium or other suitable dopant so as to render it highly sensitive to photolithographic patterning via UV light. To minimize the likelihood of duplicating the grating pattern in the lower effective index, first core of the same dual core fiber segment, the first core 56 may be doped with aluminum or other suitable dopant so as to be insensitive to the UV light.

As will be readily appreciated by those skilled in the art, when the grating 18 is provided in the second core 58 of dual core fiber 14, as shown in FIG. 5, a selected optical signal among DWDM optical signals $\lambda_1$-$\lambda_n$ propagating along the first fiber core 56 will be inturbrated by the grating. The wavelength meeting the condition a $\lambda_{12}=(n_1+n_2)\lambda$ will be reflected back to the second core, where $n_1$ and $n_2$ represent the refractive indices of the first and second core, respectively, and $\lambda$ is the Bragg grating period. Similarly, an optical signal propagating in second core 58 will be reflected back to first core 56 when its wavelength meets the condition $\lambda_{21}=(n_1+n_2)\lambda$. Finally, the optical signal propagating in second core 58 will be reflected back to second core 58 when the wavelength meets the condition $\lambda_{22}=2n_2\lambda$. Other optical signals propagating in cores 56 and 58 will not be affected by the Bragg grating and therefore continue to propagate in core 56 or core 58. If a long period fiber grating with period $\lambda_L$ is written in t e second core, the optical light propagating in the first core will be transferred by fiber grating to the second core if the wavelength meets the condition $\lambda_{12}=(n_2-n_1)\lambda_L$. Conversely, the optical light propagating in the second core will be transferred by the fiber grating to the first core if the wavelength meets the condition $\lambda_{21}=(n_2-n_1)\lambda_L$ Returning now to the demultiplexer structure 22 of FIG. 3, it will be seen that the light propagating in first core 56 of dual core fiber segment 14 interacts with grating 18, and a selected wavelength selected by the defined grating period (e.g. $\lambda_2$) is reflected back to second core 58 of coupler port 3. All of the other wavelengths (e.g., $\lambda_1$ and $\lambda_3$-$\lambda_n$) simply pass through coupler 12 and are output via port 3 thereof into a destination fiber, which may be a single mode fiber (not shown) fusion spliced to the port 3 end of dual core fiber segment 14. The $\lambda_2$ propagates in the second core 58 back to the fused coupler 12, and is coupled to the second core 62 of the second dual core fiber segment 16. The output from the second core 62 exiting at coupler port 2 may be to a single mode fiber (not shown) fusion spliced at the port 2 end of fiber segment 16. In this manner, an optical signal at any desired wavelength may be dropped without affecting the many other optical signals propagating along a fiber. Because of the very low losses involved, this same process may be repeated for as many signals as desired, with a much lower impact on system power margin than has heretofore been possible.

A multiplexer structure constructed in accordance with the present invention operates in a comparable fashion to the demultiplexer 22 of FIG. 3 except that the direction of light input into coupler 12 is reversed. An illustrative multiplexer structure 24 will now be described by specific reference to FIG. 4, where it will be seen that DWDM optical signals as optical signals $\square_1 - \square_n$ propagating on first core 56 enter dual core fused coupler 12 at port number 3, pass through it, and exit at port 1. An optical signal, illustratively $\square_{n+2}$ is added by introducing the same into second core 62 at port 2 The optical signal $\square_{n+1}$ is coupled into second core 58 and interacts with grating 18. The grating is dimensioned and arranged to reflect the add signal back to first core 56 so that it joins the other signals (e.g., $\square_1 - \square_n$) already propagating therealong. As such, optical signals $\square_1 - \square_{n+1}$ exit coupler 12 at port 1. Here again, because of the very low losses associated with the in-line DWDM filter of the present invention, the signal addition process may be repeated for as many signals as is desired for DWDM transmission along a single fiber, with a much lower impact on system power margin than has heretofore been possible.

Figure 4:
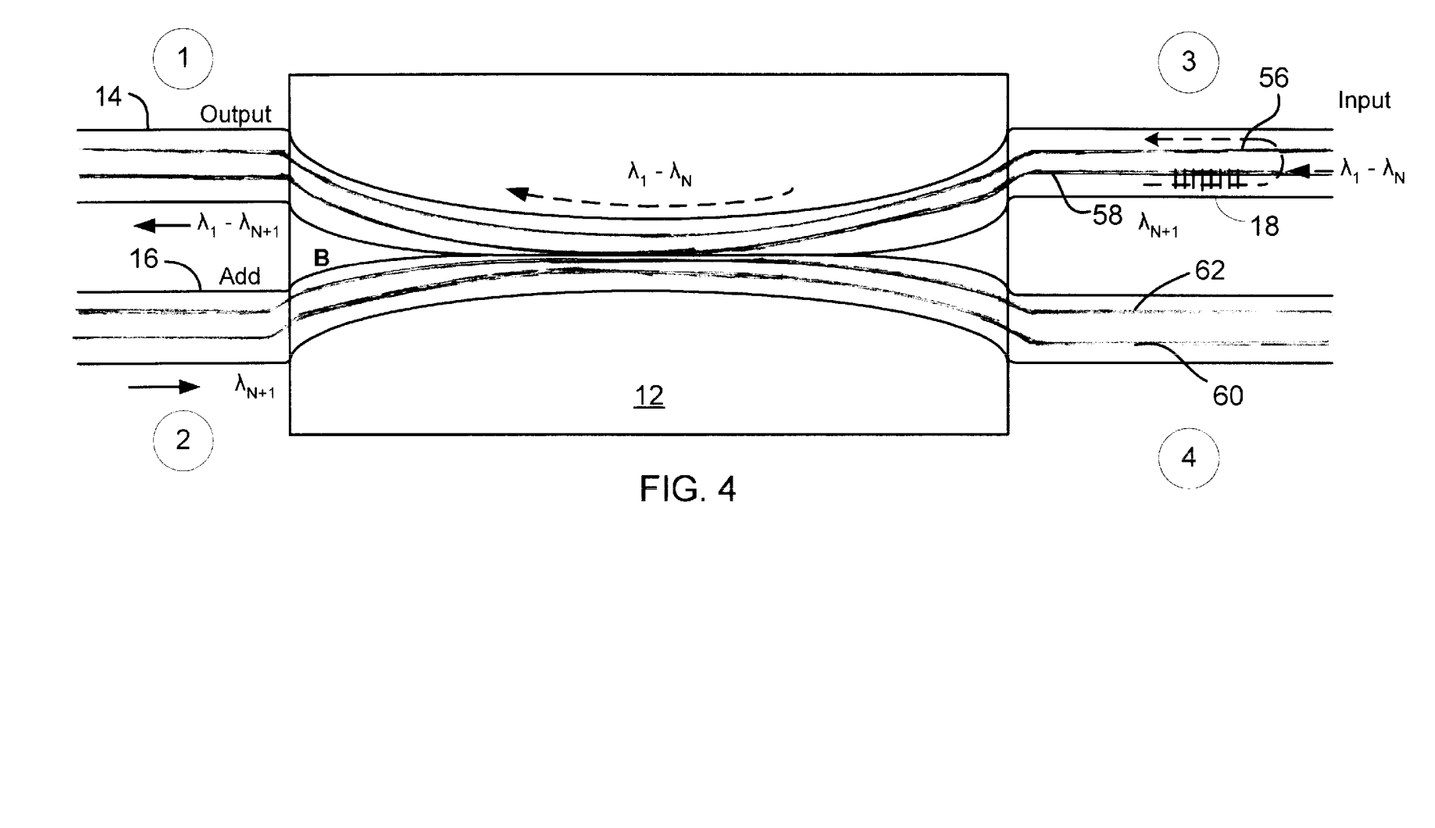
FIG. 4 is a multiplexer constructed in accordance with another embodiment of the DWDM filter of the present invention, with arrows added to indicate the addition of an optical signal coupled, via a core of one optical fiber, into the second core of a dual core fiber having a fiber grating whereby the optical signal may thereafter be coupled to the other core for propagation along with other DWDM optical signals.

As will be readily appreciated by those skilled in the art, multiple gratings—each having a period corresponding to a different wavelength to be dropped or added, may be defined on the second core 58 of first fiber 14 in either of the embodiments of FIGS. 3 and 4 so as to permit adding or dropping of multiple DWDM optical channels. By appropriate grating period selection, it is also possible to add or remove a broad wavelength band. By way of still further illustrative example, it is also possible to define a chirped fiber grating so as to allow different wavelengths to be reflected by the fiber grating at different positions and thereby compensate optical chromatic dispersion.

It is thus believed that the operation and construction of the present invention will be apparent from the foregoing description. While the method, apparatus and system shown and described herein has been characterized as being preferred, it will be readily appreciated by those skilled in the art that various changes and modifications may be made thereto which will embody the principles of the invention and fall within the spirit and scope of the appended claims.

What is claimed is:

1. An optical fiber coupling device comprising:
a first multiple core fiber, a first core of said first multiple core fiber having an effective index of refraction and propagation constant different from an effective index of refraction and propagation constant of a second core of said first multiple core fiber; and
a second multiple core fiber, a first core of said second multiple core fiber having an effective index of refraction and propagation constant different from an effective index of refraction and propagation constant of a second core of said second multiple core fiber, the effective index of refraction and propagation constant of the second core of the second multiple core fiber being substantially equal to the effective index of refraction and propagation constant of the second core of the first multiple core fiber;
wherein said first and second multiple core fibers are aligned and fused together such that the second core of the first multiple core fiber is in sufficient proximity to the second core of the second multiple core fiber as to obtain overlapping of mode fields and efficient coupling of propagating optical signals therebetween and such that the first core of the first multiple core fiber is sufficiently separated from the first core of the second multiple core fiber as to obtain weak or substantially no coupling of propagating optical signals therebetween, whereby any optical signal propagating along the first core of the first multiple core fiber achieves low loss.

2. The optical fiber coupling device according to claim 1, wherein the effective index of refraction and propagation constant of the first core of the second multiple core fiber is equal to the effective index of refraction and propagation constant of the first core of the first multiple core fiber.

3. The optical fiber coupling device according to claim 1, wherein the respective first core of each corresponding multiple core fiber extends along a longitudinal, geometric central axis of said each corresponding multiple core fiber.

4. The optical fiber coupling device according to claim 1, wherein the effective index of refraction of each respective first core is lower than an effective index of refraction of a corresponding second core.

5. The optical fiber coupling device according to claim 1, wherein the first core of the first multiple core fiber is substantially insensitive to ultraviolet radiation incident thereon.

6. The optical fiber coupling device according to claim 1, wherein the second core of the first multiple core fiber extends along a longitudinal fiber axis offset from a geometric central axis of the first multiple core fiber.

7. The optical fiber coupling device according to claim 1, wherein the second core of the first multiple core fiber is doped with a sufficient concentration of a dopant as to be sensitive to ultraviolet radiation incident thereon.

8. The optical fiber coupling device according to claim 7, wherein the second core of said first multiple core fiber has a fiber Bragg grating defined thereon by exposure to ultraviolet radiation, a period of said fiber Bragg grating being selected to efficiently couple an optical signal at a selected wavelength, propagating with optical signals at other wavelengths in a first direction along a first core of said first multiple core fiber, to the second core of said first multiple core fiber as an optical signal at the selected wavelength propagating in a second direction opposite to said first direction.

9. The optical fiber coupling device according to claim 1, wherein the second core of said first multiple core fiber has a fiber Bragg grating defined thereon, a period of said fiber Bragg grating being selected to efficiently couple an optical signal at a selected wavelength, propagating in a first direction along a first core of said first multiple core fiber, to the second core of said first multiple core fiber as an optical signal at the selected wavelength propagating in a second direction opposite to said first direction.

10. The optical fiber coupling device according to claim 9, wherein the second core of said first multiple core fiber is doped with a sufficient concentration of germanium ions as to be UV sensitive, said fiber Bragg grating being defined therein by exposure to UV radiation.

11. An optical demultiplexer comprising:
a first multiple core fiber, a first core of said first multiple core fiber having an effective index of refraction and propagation constant different from an effective index of refraction and propagation constant of a second core of said first multiple core fiber; and a second multiple core fiber, a first core of said second multiple core fiber having an effective index of refraction and propagation constant different from an effective index of refraction and propagation constant of a second core of said second multiple core fiber, the effective index of refraction and propagation constant of the second core of the second multiple core fiber being substantially equal to the effective index of refraction and propagation constant of the second core of the first multiple core fiber;

wherein said first and second multiple core fibers are aligned and fused together such that the second core of the first multiple core fiber is in sufficient proximity to the second core of the second multiple core fiber as to obtain overlapping of mode fields and efficient coupling of propagating optical signals therebetween and such that the first core of the first multiple core fiber is sufficiently separated from the first core of the second multiple core fiber as to obtain weak or substantially no coupling of propagating optical signals therebetween, whereby any optical signal propagating along the first core of the first multiple core fiber achieves low loss; and wherein the second core of said first multiple core fiber has a fiber Bragg grating defined thereon, a period of said fiber Bragg grating being selected to efficiently couple an optical signal at a selected wavelength, propagating with optical signals at other wavelengths in a first direction along a first core of said first multiple core fiber, to the second core of said first multiple core fiber as an optical signal at the selected wavelength propagating in a second direction opposite to said first direction, whereby subsequent coupling between the second core of said first multiple core fiber and said second multiple core fiber allows said coupled optical signal to be independently processed or dropped from said optical signals at other wavelengths.

12. The optical multiplexer according to claim 11, wherein the effective index of refraction and propagation constant of the first core of the second multiple core fiber is equal to the effective index of refraction and propagation constant of the first core of the first multiple core fiber.

13. An optical multiplexer comprising:

a first multiple core fiber, a first core of said first multiple core fiber having an effective index of refraction and propagation constant different from an effective index of refraction and propagation constant of a second core of said first multiple core fiber; and a second multiple core fiber, a first core of said second multiple core fiber having an effective index of refraction and propagation constant different from an effective index of refraction and propagation constant of a second core of said second multiple core fiber, the effective index of refraction and propagation constant of the second core of the second multiple core fiber being substantially equal to the effective index of refraction and propagation constant of the second core of the first multiple core fiber;

wherein said first and second multiple core fibers are aligned and fused together such that the second core of the first multiple core fiber is in sufficient proximity to the second core of the second multiple core fiber as to obtain overlapping of mode fields and efficient coupling of propagating optical signals therebetween and such that the first core of the first multiple core fiber is sufficiently separated from the first core of the second multiple core fiber as to obtain weak or substantially no coupling of propagating optical signals therebetween, whereby any optical signal propagating along the first core of the first multiple core fiber achieves low loss; and wherein the second core of said first multiple core fiber has a fiber Bragg grating defined thereon, a period of said fiber Bragg grating being selected to efficiently couple an optical signal at a selected wavelength, propagating in a first direction along a second core of said first multiple core fiber after having been coupled thereto via the second core of the second multiple core fiber, to the first core of said first multiple core fiber as an optical signal at the selected wavelength propagating in a second direction opposite to said first direction, whereby said optical signal may be combined with other optical signals propagating along said first fiber core.

14. The optical multiplexer according to claim 13, wherein the effective index of refraction and propagation constant of the first core of the second multiple core fiber is equal to the effective index of refraction and propagation constant of the first core of the first multiple core fiber.

15. A method of manufacturing an optical component comprising the steps of:

providing a first multiple core fiber, a first core of said first multiple core fiber having an effective index of refraction and propagation constant different from an effective index of refraction and propagation constant of a second core of said first multiple core fiber;

providing a second multiple core fiber, a second core of said second multiple core fiber having an effective index of refraction and propagation constant substantially equal to the effective index of refraction and propagation constant of the second core of said first multiple core fiber and a first core of said second multiple core fiber having an effective index of refraction and propagation constant substantially equal to the effective index of refraction and propagation constant of the first core of the first multiple core fiber;

removing portion of cladding along the second core of said first multiple core fiber and along said core of said second fiber to define a fusing region on each fiber;

aligning said fusing regions under pressure and applying heat to said fibers to fuse them together such that the second core of the first multiple core fiber is in sufficient proximity to said second core of the second fiber as to obtain overlapping of mode fields and efficient coupling of propagating optical signals therebetween and such that the first core of the first multiple core fiber is sufficiently separated from said first core of the second multiple core fiber as to obtain weak or substantially no coupling of propagating optical signals therebetween whereby any optical signal propagating along the first core of the first multiple core fiber achieves low loss.

16. The method of claim 15 wherein said removing step is performed by one of mechanical polishing and a chemical etch.

17. The method of claim 15, wherein said removing step is performed by removing a portion of said cladding along the second core of said second multiple core fiber.

18. The method of claim 15, further including a step of defining a fiber Bragg grating in the second core of said first dual core fiber.

19. A wavelength selecting structure for use in an in-line DWDM optical filter, comprising:

a multiple core fiber including a first core having an index of refraction and propagation constant different from an index of refraction and propagation constant of a second core of said multiple core fiber, the effective index of refraction of said first core being lower than the effective index of refraction of said second core; and a fiber Bragg grating defined on said second core, said grating having a period dimensioned and arranged to transfer an optical signal at a selected wavelength from one core of said multiple core fiber to another core of said multiple core fiber.

20. The wavelength selecting structure of claim 19, wherein the period of said grating is much longer than said selected optical wavelength.

* * * * *